United States Patent
Tezuka et al.

(10) Patent No.: US 8,709,514 B2
(45) Date of Patent: Apr. 29, 2014

(54) STEVIA FORMULATION

(75) Inventors: Yumiko Tezuka, Tokyo (JP); Takayuki Kiyofuji, Tokyo (JP); Yukie Nagai, Tokyo (JP); Toshiaki Sugitani, Tokyo (JP)

(73) Assignee: Mitsui Sugar Co., Ltd., Tokyo (JP)

( * ) Notice: Subject to any disclaimer, the term of this patent is extended or adjusted under 35 U.S.C. 154(b) by 0 days.

(21) Appl. No.: 13/639,147

(22) PCT Filed: Feb. 17, 2012

(86) PCT No.: PCT/JP2012/053877
§ 371 (c)(1),
(2), (4) Date: Oct. 3, 2012

(87) PCT Pub. No.: WO2013/114633
PCT Pub. Date: Aug. 8, 2013

(65) Prior Publication Data
US 2013/0203867 A1    Aug. 8, 2013

(30) Foreign Application Priority Data
Feb. 3, 2012 (JP) .............................. P2012-022118

(51) Int. Cl.
*A61K 36/28* (2006.01)
*A23L 1/236* (2006.01)
*A23G 3/48* (2006.01)
*A61K 36/00* (2006.01)

(52) U.S. Cl.
USPC ............................ 424/764; 426/658; 424/725

(58) Field of Classification Search
None
See application file for complete search history.

(56) References Cited

U.S. PATENT DOCUMENTS

| | | | |
|---|---|---|---|
| 2008/0014331 A1* | 1/2008 | Badalov | 426/658 |
| 2009/0004360 A1* | 1/2009 | Bingley et al. | 426/590 |
| 2009/0017185 A1 | 1/2009 | Catani | |
| 2009/0162501 A1* | 6/2009 | Canessa et al. | 426/115 |
| 2010/0029786 A1* | 2/2010 | Terada et al. | 514/772 |
| 2010/0055255 A1 | 3/2010 | Doyle et al. | |
| 2010/0267847 A1 | 10/2010 | Yoshinaka et al. | |
| 2010/0278993 A1 | 11/2010 | Prakash et al. | |
| 2011/0059218 A1 | 3/2011 | Corliss et al. | |
| 2011/0166086 A1* | 7/2011 | Toyohara et al. | 514/23 |

FOREIGN PATENT DOCUMENTS

| | | |
|---|---|---|
| JP | 02-163056 | 6/1990 |
| JP | 09-107913 | 4/1997 |
| JP | 2000-217540 | 8/2000 |
| JP | 2001-086954 | 4/2001 |
| JP | 2001-299264 | 10/2001 |
| JP | 2002-034471 | 2/2002 |
| JP | 2003-265135 | 9/2003 |
| JP | 2003-274890 | 9/2003 |
| JP | 2004-275098 | 10/2004 |
| JP | 2008-061510 * | 3/2008 |
| JP | 2008-061511 | 3/2008 |
| JP | 2010-178683 | 8/2010 |
| JP | 2010-532171 | 10/2010 |
| JP | 2010-280645 | 12/2010 |
| JP | 2011-512801 | 4/2011 |
| JP | 2011-521628 | 7/2011 |
| JP | 2011-254749 | 12/2011 |
| JP | 2012-501179 | 1/2012 |
| WO | 2009/063921 A1 | 5/2009 |

OTHER PUBLICATIONS

International Search Report issued in corresponding application No. PCT/JP2012/053877, completed Mar. 19, 2012 and mailed Apr. 3, 2012.
Tezuka, Y., "Flavor modification effect and antioxidation effect of sugar cane extract," Food processing and ingredients, vol. 45, No. 12, 2010.
Nagai, Y. et al., "Taste improving effect of sugar cane extract," A Technical Journal on Food Chemistry & Chemicals, vol. 16, No. 7., Jul. 2000.
Kawai, Toshikazu et al., "Various Applications of Sugar Cane Extracts," Proceeding of the Research Society of Japan Sugar Refineries' Technologists, vol. 50, 2002, p. 29-36.
Office Action issued in counterpart application P2012-521414 on Jul. 24, 2012.
Partial translation of JP 2008-061510, published Mar. 21, 2008, Tezuka et al.

* cited by examiner

*Primary Examiner* — Chris R Tate
(74) *Attorney, Agent, or Firm* — Griffin & Szipl, P.C.

(57) ABSTRACT

The invention provides a stevia formulation comprising a stevia sweetener with a rebaudioside A content of 95% or greater, and 0.25 to 5.15 parts by weight of a sugarcane-derived extract (a), 0.06 to 2.50 parts by weight of a sugarcane-derived extract (b) and 0.002 to 12.5 parts by weight of γ-aminobutyric acid with respect to 100 parts by weight of the stevia sweetener.

4 Claims, No Drawings

STEVIA FORMULATION

This is a National Phase Application in the United States of International Patent Application No. PCT/JP2012/053877 filed Feb. 17, 2012, which claims priority on Japanese Patent Application No. P2012-022118, filed Feb. 3, 2012. The entire disclosures of the above patent applications are hereby incorporated by reference.

TECHNICAL FIELD

The present invention relates to a stevia formulation.

BACKGROUND ART

Stevia (scientific name: Stevia rebaudiana) comprises sweetness components having approximately 300 times the sweetness of sucrose. The known sweetness components in stevia include stevioside, rebaudioside A, rebaudioside C, rebaudioside D, rebaudioside E and dulcoside A. Of these, rebaudioside C and dulcoside A are known to also have a strong bitter taste.

Stevia extracts containing these sweetness components, when used as sweeteners, have the disadvantage of producing unpleasant tastes such as bitterness as residual aftertastes. Examples of stevia sweeteners with improved taste quality that are known include stevia sweeteners with increased rebaudioside A content, and transglucosylated stevia sweeteners prepared by α-addition of glucose on the aforementioned sweetness components (Patent documents 1 and 2, for example).

Also, Patent document 3 teaches that the aftertaste, bitterness and metallic taste of transglucosylated stevia sweeteners is reduced by adding flavor improvers, containing sugarcane-derived extracts and specific auxiliary additives, to transglucosylated stevia sweeteners.

CITATION LIST

Patent Literature

[Patent document 1] Japanese Unexamined Patent Application Publication HEI No. 2-163056
[Patent document 2] Japanese Unexamined Patent Application Publication HEI No. 9-107913
[Patent document 3] Japanese Unexamined Patent Application Publication No. 2008-61510

SUMMARY OF INVENTION

Problems to be Solved by the Invention

Rebaudioside A has high sweetness and good taste quality, among the sweetness components present in stevia. Therefore, stevia sweeteners with high rebaudioside A contents (for example, 95 wt % or greater) (hereunder also referred to as "high-purity rebaudioside A products") are considered promising as natural sweeteners. However, even high-purity rebaudioside A products produce unpleasant tastes such as aftersweetness (undesirable lingering sweetness) and bitterness, and still do not provide satisfactory results.

With the flavor improver of Patent document 3, it is possible to reduce the unpleasant tastes such as aftersweetness and bitterness of transglucosylated stevia sweeteners. However, study by the present inventors has shown that when the flavor improver of Patent document 3 is used, in a high-purity rebaudioside A product, the buildup of sweetness and the body (the depth of sweetness) are less than adequate, and the desirable flavor (the flavor that is desired to be remained) effect for the food or beverage to which the stevia sweetener is added is suppressed.

It is therefore an object of the present invention to provide a stevia formulation which adequately reduces aftersweetness and bitterness of high-purity rebaudioside A products, while having rapid buildup of sweetness, excellent body and an excellent desirable flavor effect.

Means for Solving the Problems

The present invention provides a stevia formulation comprising a stevia sweetener with a rebaudioside A content of 95% or greater, and 0.25 to 5.15 parts by weight of a sugarcane-derived extract (a), 0.06 to 2.50 parts by weight of a sugarcane-derived extract (b) and 0.002 to 12.5 parts by weight of γ-aminobutyric acid with respect to 100 parts by weight of the stevia sweetener, wherein the extract (a) contains a first eluted component obtained by passing a raw material selected from the group consisting of sugarcane juice and sugarcane-derived molasses through a column packed with a first porous adsorbent, and eluting the components adsorbed onto the first porous adsorbent with a solvent containing at least one selected from the group consisting of methanol and ethanol, the first porous adsorbent being at least one selected from the group consisting of aromatic resins, acrylic acid-based methacryl resins and acrylonitrile aliphatic resins, and the extract (b) contains a second eluted component obtained by passing a solution containing a distillate, obtained by distillation of a raw material selected from the group consisting of sugarcane juice and solvent extracts of sugarcane, through a column packed with a second porous adsorbent, and eluting the components adsorbed onto the second porous adsorbent with a solvent containing at least one selected from the group consisting of methanol and ethanol, the second porous adsorbent being at least one selected from the group consisting of aromatic resins, acrylic acid-based methacryl resins and acrylonitrile aliphatic resins.

The stevia formulation adequately reduces aftersweetness and bitterness of high-purity rebaudioside A products, while having rapid buildup of sweetness, excellent body and an excellent desirable flavor effect. The stevia formulation has properties not exhibited by existing stevia formulations.

Foods or beverages and pharmaceutical products according to the invention have the aforementioned stevia formulation added thereto. Thus, a food or beverage and a pharmaceutical product of the invention have adequately reduced aftersweetness and bitterness of stevia sweeteners, rapid buildup of sweetness and excellent body, and exhibit an excellent taste sensation with adequate residue of desirable flavor.

The invention further provides a method for improving the flavor of a stevia sweetener, using a combination of a stevia sweetener with a rebaudioside A content of 95% or greater, and 0.25 to 5.15 parts by weight of a sugarcane-derived extract (a), 0.06 to 2.50 parts by weight of a sugarcane-derived extract (b) and 0.002 to 12.5 parts by weight of γ-aminobutyric acid with respect to 100 parts by weight of the stevia sweetener. The sugarcane-derived extract (a) and extract (b) are the same as described above.

Effects of the Invention

According to the invention there is provided a stevia formulation which adequately reduces unpleasant tastes such as aftersweetness, bitterness and metallic taste of high-purity rebaudioside A products, and which has rapid buildup of sweetness (i.e., a short time until sweetness is sensed after placement in the mouth), excellent body and an excellent desirable flavor effect.

EMBODIMENTS FOR CARRYING OUT THE INVENTION

Preferred embodiments of the invention will now be explained. However, the present invention is not limited to the embodiments described below.

The stevia formulation of the invention comprises a stevia sweetener with a rebaudioside A content of 95% or greater, a sugarcane-derived extract (a), a sugarcane-derived extract (b) and γ-aminobutyric acid.

[Stevia Sweetener]

A stevia sweetener is a sweetener derived form a sweetness component extracted from stevia. For example, plant body or dried leaves of stevia are extracted with water or an aqueous solvent, and the sweetness components are separated or concentrated from the obtained extract to obtain a stevia sweetener.

Numerous components are contained in stevia extract as sweetness components, including stevioside, rebaudiosides A, C, D and E, and dulcoside A. Common stevia extract has a high stevioside content. Such mixtures have unpleasant bitterness and aftersweetness, and improved taste quality is desired. These include, for example, stevia sweeteners with increased α-glucosylstevioside content by glucosyltransferase-mediated transglucosylation of stevioside as the main component (transglucosylated stevia), and stevia sweeteners with increased rebaudioside A content.

Rebaudioside A is considered to have high sweetness and good taste quality, among the sweetness components present in stevia extract. Thus, a stevia sweetener with a rebaudioside A content of, for example, 95 wt % or greater (high-purity rebaudioside A product), has reduced bitterness and aftersweetness compared to stevia sweeteners and transglucosylated stevia with stevioside as the main component. However, even high-purity rebaudioside A products have room for improvement in terms of bitterness and aftersweetness.

The stevia formulation of the invention can adequately reduce bitterness and aftersweetness of the stevia sweetener, since it employs a combination of a specific amount of extract (a), extract (b) and γ-aminobutyric acid with a specific stevia sweetener (high-purity rebaudioside A product). In addition, the stevia formulation of the invention also exhibits surprising effects including excellent buildup of sweetness and body, and excellent desirable flavor effects for foods or beverages to which the stevia sweetener is added.

Thus, a stevia sweetener to be used in the stevia formulation of the invention is preferably a stevia sweetener with a rebaudioside A content of 95 wt % or greater with respect to the total amount of the stevia sweetener. The stevia sweetener more preferably has a rebaudioside A content of 97 wt % or greater to exhibit the effect of the invention even more prominently. There is no particular restriction on the upper limit for the rebaudioside A content of the stevia sweetener, and for example, it may have a purity with a rebaudioside A content of 99 wt % or greater.

The stevia sweetener to be used in the stevia formulation of the invention may be, specifically, Rebaudioside A with a rebaudioside A content of 95 wt % or greater (product of Haoten) (trade name in U.S.: Stevia R-A, sold by Shanghai Freemen), Rebaudio J-100 (Morita Kagaku Kogyo Co., Ltd.) and Rebaudioside A (β Food Science Co., Ltd.). These are available as commercial products.

[Sugarcane-Derived Extract]

The stevia formulation of the invention contains 2 different sugarcane-derived extracts (extract (a) and extract (b)). Extract (a) and extract (b) will now each be described in detail.

<Extract (a)>

Extract (a) is an extract obtained by passing a raw material (sugarcane juice and/or sugarcane-derived molasses) through a column packed with a porous adsorbent, and eluting the components adsorbed onto the porous adsorbent with an elution solvent.

The raw material is passed through the column packed with the porous adsorbent either directly, or after adjustment to a desired concentration with water. From the viewpoint of manageability during the column treatment, the concentration is preferably adjusted with water so that the Brix (Bx.) of the raw material is 5-30%. Also, when the raw material contains an alcohol, the raw material is preferably passed through after dilution with water to adequately lower the alcohol concentration, from the viewpoint of reliably adsorbing the active ingredients onto the porous adsorbent.

Column treatment of the raw material allows the active ingredients that contribute to the effect of the invention to be extracted from the raw material. The column treatment is preferably carried out using column chromatography, with a column packed with a porous adsorbent. Column treatment using column chromatography (hereunder referred to as "column chromatography treatment") will now be explained in detail.

The porous adsorbent to be packed into the column is preferably a synthetic porous adsorbent. A preferred synthetic porous adsorbent is composed of an organic resin. The organic resin used may be, for example, an aromatic resin, an acrylic acid-based methacryl resin or an acrylonitrile aliphatic resin. An aromatic resin is preferred, among these organic resins.

An aromatic resin porous adsorbent may be, for example, a porous adsorbent comprising a styrene-divinylbenzene-based resin. The aromatic resin may be a porous resin such as an aromatic resin with a hydrophobic substituent, an unsubstituted aromatic resin, an aromatic resin that has been specially treated to an unsubstituted type, or the like, but an aromatic resin specially treated to an unsubstituted type is preferred.

Commercially available porous adsorbents include DIAION™ HP-10, HP-20, HP-21, HP-30, HP-40 and HP-50 (all unsubstituted aromatic resins, trade names of Mitsubishi Chemical Corp.); SP-825, SP-800, SP-850, SP-875, SP-70 and SP-700 (all aromatic resins specially treated to unsubstituted types, trade names of Mitsubishi Chemical Corp.); SP-900 (aromatic resin, trade name of Mitsubishi Chemical Corp.); AMBERLITE™ XAD-2, XAD-4, XAD-16 and XAD-2000 (all aromatic resins, trade names of Organo Corp.); DIAION™ SP-205, SP-206 and SP-207 (all aromatic resins with hydrophobic substituents, trade names of Mitsubishi Chemical Corp.); HP-2MG and EX-0021 (both aromatic resins with hydrophobic substituents, trade names of Mitsubishi Chemical Corp.); AMBERLITE™ XAD-7 and XAD-8 (both acrylic acid ester resins, trade names of Organo Corp.); DIAION™ HP1MG and HP2MG (both methacryl acrylate resins, trade names of Mitsubishi Chemical Corp.); and SEPHADEX™ LH20 and LH60 (both crosslinked dextran derivatives, trade names of Pharmacia Biotech, Inc.). SP-850 is particularly preferred among these.

The amount of solid support (porous adsorbent) to be packed into the column may be appropriately determined based on the size of the column, the type of solvent and the type of solid support. When a raw material with a solid portion (for example, sugarcane juice) is to be passed through the column, the solid support is preferably packed at a 0.01- to 5-fold wet volume with respect to the solid portion.

By passing such as a raw material through the column, the active ingredients in the raw material that contribute to the effect of the invention are adsorbed onto the porous adsorbent, while most of the sucrose, glucose, fructose and inorganic salts run off. The flow volume and flow speed may be appropriately set depending on the composition and viscosity of the raw material.

The components to be adsorbed onto the porous adsorbent can be eluted with a solvent (elution solvent). In order to efficiently recover the eluted components (that is, the active ingredients that contribute to the effect of the invention), it is preferred to thoroughly wash off the residual sucrose, glucose, fructose and inorganic salts in the column by rinsing, before the elution solvent is passed through.

The elution solvent used may be one comprising methanol, ethanol, or a mixture thereof. The elution solvent is preferably a mixed solvent of water and an alcohol, and most preferably an ethanol-water mixture. From the viewpoint of efficiently eluting the desired active ingredients at room temperature, it is especially preferred to use an ethanol-water mixture with a mixing volume ratio (ethanol/water) of 50/50 to 60/40.

The elution rate may be appropriately varied depending on the size of the column, the type of solvent and the type of porous adsorbent, but preferably SV=0.1-10 $hr^{-1}$. The SV (Space Velocity) is a unit for the volume multiples of a fluid passing through with respect to the volume of a porous adsorbent per hour.

There are no particular restrictions on the form of the extract (a) (sugarcane-derived extract), but from the viewpoint of facilitating storage and ease of use, it is preferably in liquid or powder form. The extract (a) may also be a solid formulation or fluid formulation prepared using a commonly employed formulating support. The formulating method may be an appropriately employed method known in the prior art. When extract (a) is in liquid form, it is preferably concentrated to a solid content of 20 wt % or greater from the viewpoint of preventing putrefaction. A liquid extract (a) is preferably held in cold storage.

A powdered extract (a) is obtained by powdering a concentrated eluate. As the powdering treatment there may be appropriately employed a known method in the prior art such as, for example, a spray dry method, freeze-drying method, fluidized bed granulation method or a powdering method using an excipient.

Since the extract (a) is prepared using natural sugarcane as the raw material, even if it is produced under the same conditions it may have different measured values depending on the type, growing district and growth conditions of the sugarcane. The measured values for a sugarcane-derived extract for Production Example 1 (concentrate obtained by concentration under reduced pressure) are described below as an example.

<Measured Values of Sugarcane-Derived Extract (Production Example 1)>

Solid concentration (based on the total weight of concentrate): 37.4 wt %

Brix (Bx.): 40.6%

Sugar content (based on the total weight of solid portion): 9.8 wt %

Sugars: 6.8 wt % sucrose, 1.4 wt % glucose, 1.6 wt % fructose

Polyphenol content (based on the total weight of solid portion): 5.0 wt %

The solid concentration was measured by a heat drying method at ordinary pressure. The Brix was measured using a Brix meter. The sugar content and sugars were measured by high-performance liquid chromatography (HPLC). Measurement of the polyphenol content was conducted by the Folin-Ciocalteu method. That is, the polyphenol content was represented as the value in terms of catechins, drawing a calibration curve with a catechin aqueous solution as the standard solution, conducting reaction with a phenol reagent and measuring the absorbance at a wavelength of 760 nm.

The amount of extract (a) used in the stevia formulation of the invention is preferably 0.25 to 5.15 parts by weight with respect to 100 parts by weight of the stevia sweetener. This range will allow the effect of the invention to be even more satisfactorily exhibited. From the viewpoint of further reducing aftersweetness and bitterness and obtaining a more excellent desirable flavor effect, the amount of extract (a) used is more preferably 0.35 to 5.00 parts by weight and even more preferably 0.45 to 4.75 parts by weight with respect to 100 parts by weight of the stevia sweetener.

<Extract (b)>

Extract (b) is an extract obtained by distillation treatment and column treatment of a raw material selected from the group consisting of sugarcane juice and solvent extracts of sugarcane.

The distillation treatment is accomplished by placing the raw material in the tank of a distilling apparatus equipped with a heating apparatus, heating the tank, and recovering the vapor produced from the raw material. By the distillation treatment, vapor containing the sugarcane-derived distillate is recovered directly as a gas or preferably as a fluid, and is separated from the non-vaporizing solid portion.

The temperature conditions for the distillation treatment are preferably 50-120° C., more preferably 80-120° C. and even more preferably 85-120° C. The pressure conditions for the distillation treatment are preferably 240-1450 mmHg and more preferably 450-1450 mmHg. The pressure conditions for the distillation treatment may be modified according to the composition of the raw material, so that the raw material boils under the desired temperature conditions.

The distillation treatment may also be carried out under pressure conditions of pressurization or reduced pressure, with atmospheric pressure (760 mmHg) as the reference. For example, the preferred conditions for distillation treatment of sugarcane juice under pressurization are a pressure of 980-1425 mmHg and a temperature of 110-118° C. On the other hand, the preferred conditions for distillation treatment of sugarcane juice under reduced pressure or atmospheric pressure are a pressure of 460-760 mmHg and a temperature of 87-100° C.

The distillation treatment conditions may be appropriately modified depending on the type of solvent in the raw material, its proportion, and the apparatus used for the distillation treatment. For example, when the raw material is a sugarcane solvent extract obtained using water as the extraction solvent, and the distilling apparatus used is a centrifugal thin-film vacuum evaporator, a condenser tube-connected flask or a distiller, and the preferred distillation conditions are a temperature of 70-105° C. and a pressure of 240-760 mmHg. Distillation treatment under conditions with a temperature of lower than 70° C. and/or a pressure of less than 240 mmHg can be applied on an experimental small-scale, but is usually not used for large-scale applications from the viewpoint of distilling apparatus cost and manageability.

A common distilling apparatus or vaporizer may be used for the distillation treatment. That is, it may be one comprising a heating apparatus that can hold the raw material and that heats it, a cooling device that cools vapor generated by the heating, and a recovery apparatus that recovers the cooled vapor as a liquid or gas. The distilling apparatus used may be, in a laboratory for example, a flask equipped with a condenser tube and the like, or in a factory, an apparatus equipped with a concentration can, crystallization can, utility can, or the like.

By modifying the temperature conditions and pressure conditions for the distillation treatment, the active ingredients in the raw material may be concentrated to obtain a distillate containing the active ingredients at the prescribed concentration.

The column treatment is carried out for the purpose of further concentrating the active ingredients in the distillate obtained by the distillation treatment. The column treatment is preferably accomplished by column chromatography. The conditions for column chromatography (the porous adsorbent used, the flow volume, etc.) may be the same as for column chromatography in production of extract (a), but the particularly preferred conditions and method are as follows.

The porous adsorbent to be packed into the column is preferably an unsubstituted aromatic resin or acrylic acid-based ester resin. The amount of porous adsorbent to be packed into the column may be appropriately determined based on the size of the column, the type of solvent and the type of porous adsorbent. For example, for column treatment of a liquid raw material, a distillate flow volume of 1.5 to 20,000 parts by volume is common, where the amount of porous adsorbent in the column is defined as 1 part by volume. That is, the porous adsorbent may be packed into the column at a wet volume of 1/20,000 to 1/1.5 of the flow volume of the raw material.

The distillate obtained by the distillation treatment is passed through a column packed with the porous adsorbent. Here, the column temperature is preferably in the range of 60-97° C. After it has completely passed through, water is passed through the column for rinsing of the column.

Next, the components that have adsorbed onto the column are eluted with an ethanol-water mixed solvent with a mixing volume ratio (ethanol/water) of 50/50 to 99.5/0.5. Here, the column temperature is preferably in the range of 20-40° C. After elution with the ethanol-water mixed solvent has begun, elution is continued until the amount of recovered eluate reaches the prescribed amount. For example, recovery of the eluate is completed when the amount of recovered solution has reached 6 parts by volume, where the wet volume of the packed porous adsorbent is defined as 1 part by volume. In this case, the obtained eluate (containing the elution solvent) may be used as the sugarcane-derived extract.

The amount of extract (b) used in the stevia formulation of the invention is preferably 0.06 to 2.50 parts by weight with respect to 100 parts by weight of the stevia sweetener. This range will allow the effect of the invention to be even more satisfactorily exhibited. From the viewpoint of further reducing aftersweetness and bitterness and obtaining a more excellent desirable flavor effect, the amount of extract (b) used is more preferably 0.08 to 2.00 parts by weight and even more preferably 0.10 to 1.80 parts by weight with respect to 100 parts by weight of the stevia sweetener.

[γ-Aminobutyric Acid]

γ-Aminobutyric acid is also known as 4-aminobutyric acid (4-aminobutanoic acid). γ-Aminobutyric acid is a non-protein amino acid widely present in the living world, though in trace amounts, and it is a substance with important physiological functions. In humans, for example, it is known to localize in the brain and act as a brain neurotransmitter. In addition, γ-aminobutyric acid is known to have a blood pressure elevation-inhibiting effect, as well as effects of inhibiting triglyceride increase, alleviation of climacteric disturbance symptoms, brain function improvement, ataractic effects and memory improvement.

Various methods exist for production of γ-aminobutyric acid, and any of them may be employed. Methods for producing γ-aminobutyric acid include chemical synthesis methods, production methods using glutamate decarboxylase or flora and fauna containing the enzyme, and fermentation methods using microorganisms that produce glutamate decarboxylase.

The γ-aminobutyric acid to be used in a stevia formulation of the invention may be, specifically, Pharma GABA (product of Pharma Foods International Co., Ltd., γ-aminobutyric acid: ≥80%), GABA Kyowa (product of Kyowa Hakko Bio Co., Ltd., γ-aminobutyric acid: ≥99%), Oryza GABA Extract-HC90 (product of Oryza Oil & Fat Chemical Co., Ltd., γ-aminobutyric acid: ≥90), or the like. These are available as commercial products.

The amount of γ-aminobutyric acid used in the stevia formulation of the invention is preferably 0.002 to 12.5 parts by weight with respect to 100 parts by weight of the stevia sweetener. This range will allow the effect of the invention to be even more satisfactorily exhibited. From the viewpoint of further reducing aftersweetness and bitterness and obtaining a more excellent desirable flavor effect, the amount of γ-aminobutyric acid used is more preferably 0.010 to 10.0 parts by weight and even more preferably 0.012 to 8.5 parts by weight with respect to 100 parts by weight of the stevia sweetener.

[Other Components]

The stevia formulation of the invention may also contain other additives in addition to the stevia sweetener (high-purity rebaudioside A product), sugarcane-derived extract (a), sugarcane-derived extract (b) and γ-aminobutyric acid, in ranges that do not interfere with the effect of the invention. Examples of such additives include excipients, coloring agents, aromatics, antioxidants, preservatives, acidulants and other sweeteners.

[Stevia Formulation]

There are no particular restrictions on the form of the stevia formulation, but from the viewpoint of facilitating storage and ease of use, it is preferably in liquid or powder form. The stevia formulation may also be a solid formulation or fluid formulation prepared using a commonly employed formulating carrier. The formulating method may be an appropriately employed method known in the prior art. When stevia formulation is in liquid form, it is preferably concentrated to a solid content of 20 wt % or greater from the viewpoint of preventing putrefaction. A liquid stevia formulation is preferably held in cold storage.

When the stevia formulation is to be used as a solid formulation, the solid formulation may be prepared by mixing corn starch or dextrin with the liquid stevia formulation. There may also be employed a conventional known method of formulation in accordance with a food or beverage or a pharmaceutical product in which the stevia formulation is to be used.

The stevia formulation of the invention may be obtained by preparing a composition comprising the stevia sweetener (high-purity rebaudioside A product), sugarcane-derived extract (a), sugarcane-derived extract (b) and γ-aminobutyric acid, optionally mixed with other additives, and formulating as a solid formulation or liquid formulation as described above, or alternatively, one or more components selected from among the stevia sweetener (high-purity rebaudioside A product), sugarcane-derived extract (a), sugarcane-derived extract (b) and γ-aminobutyric acid, and optionally other additives, may be prepared as a solid formulation or liquid formulation independently from the other components, and mixed with the other components at the time of use.

The stevia formulation of the invention may be used by addition to a food or beverage or a pharmaceutical product.

The stevia formulation of the invention having the construction described above adequately reduces the bitterness and aftersweetness of stevia sweetener, and is suitable as a sweetener. In addition, it has rapid buildup of sweetness and excellent body, and can fully bring out the original desirable flavor of the food or beverage to which it is added, and therefore the flavor of foods or beverages that employ the stevia formulation of the invention can be further improved.

Specifically, such foods and beverages include soft drinks, carbonated beverages, jelly beverages, health foods and beverages, and alcoholic beverages. Pharmaceutical products include lozenges, syrups, powders and powdered drugs. The stevia formulation of the invention may be suitably used in foods or beverages with desirable flavors. Examples of such foods and beverages include near water, processed citrus products, vegetable beverages, coffee, black tea and other teas, and foods or beverages containing them, fruit wine, galenical-containing foods and beverages, mineral-containing beverages, vinegar products, processed plum products, processed seafood products, natural seasonings, spicy vegetables and spices, and food or beverages containing them, vitamin-containing foods and beverages, cacao products, honey products, milk and dairy products, alcoholic beverages such as chu-hi cocktails, and the like, with no particular limitation to these.

[Flavor-Improving Method]

The method for improving the flavor of a stevia sweetener according to the invention, is a method using a combination of a stevia sweetener with a rebaudioside A content of 95% or greater, and 0.25 to 5.15 parts by weight of extract (a), 0.06 to 2.50 parts by weight of extract (b) and 0.002 to 12.5 parts by weight of γ-aminobutyric acid with respect to 100 parts by weight of the stevia sweetener. As mentioned above, when prescribed amounts of extract (a), extract (b) and γ-aminobutyric acid are used in combination with a stevia sweetener (high-purity rebaudioside A product), the bitterness and aftersweetness of the stevia sweetener is reduced, and a product with rapid buildup of sweetness, excellent body and an excellent desirable flavor effect (that is, improved flavor of the stevia sweetener) is obtained.

Here, "used in combination" means that when the stevia sweetener (high-purity rebaudioside A product) is added to a food or beverage or pharmaceutical product and used as a sweetener, the extract (a), extract (b) and γ-aminobutyric acid are also added in the prescribed amounts to the food or beverage or pharmaceutical product. Thus, the high-purity rebaudioside A product, extract (a), extract (b) and γ-aminobutyric acid may be mixed to obtain a composition before their addition to the food or beverage or drug, or they may be each independently added to the food or beverage or drug.

EXAMPLES

The present invention will now be described in greater detail by examples, with the understanding that the invention is not limited to the examples.

<Sugarcane-Derived Extract>

Production Example 1

Production of Extract (a)

Sugarcane pressed juice (solid portion: 18.6 wt %, approximately 1000 liters) obtained by a production process at an unrefined sugar manufacturing plant was heated to 80° C. using a juice heater. The heated pressed juice was subjected to filtration to obtain a filtrate (approximately 750 liters). The filtration of the pressed juice was accomplished by tube ultrafiltration (Model MH25, effective membrane area: 2 $m^2 \times 3$, molecular cutoff: 100,000, product of Daicel Chemical Industries, Ltd.).

Separately, a water jacket-equipped column (column size: 17.0 cm inner diameter, 100 cm height) was filled up with 15 liters of a synthetic adsorbent (SP-850TM by Mitsubishi Chemical Corp.), to prepare a column for column treatment of the filtrate.

The filtrate was passed through the prepared column at a flow rate of 75 liter/hr (SV=5 $hr^{-1}$). During passage of the filtrate, water at 65° C. was continuously circulated through the water jacket of the column. Upon completion of passage of the filtrate, 45 liter of ion-exchanged water was passed through the column at a flow rate of 30 liter/hr (SV=2 $hr^{-1}$) to rinse the column interior. Detection of saccharides was performed in the fraction eluted from the column by passage of the ion-exchanged water. As a result, essentially no saccharides were detected (Brix: approximately 0%), confirming that the column interior had been thoroughly rinsed by the ion-exchanged water. A hand refractometer (Model N-1E by Atago Co., Ltd.) was used for detection of saccharides.

After rinsing with ion-exchanged water, 30 liter of elution solvent was passed through the column at a flow rate of 30 liter/hr (SV=2 $hr^{-1}$), for elution of the components adsorbed onto the synthetic adsorbent. The elution solvent used was a 55% ethanol aqueous solution (ethanol/water=55/45 (vol/vol)). After passage of the elution solvent, ion-exchanged water was passed through the column at a flow rate of 30 liter/hr, for a period of 20 minutes. During passage of the elution solvent and subsequent ion-exchanged water, water at 25° C. was continuously circulated through the water jacket of the column.

The eluate which had eluted from the column by passage of the elution solvent was mixed with the eluate obtained by subsequent passage of the ion-exchanged water, and the mixture was concentrated approximately 20-fold under reduced pressure to obtain a concentrate. The concentrate was freeze-dried for 12 hours to obtain 435 g of a dark brown powder (first eluted component). The sugarcane-derived extract obtained by this production example will hereunder be referred to as "extract (a)".

Production Example 2

Production of Extract (b)

For distillation treatment of sugarcane pressed juice (Brix: 12.5%, 2800 liters) obtained by a production process at an unrefined sugar manufacturing plant, the pressed juice was supplied to a distilling apparatus at a rate of 250 liter/hr. For distillation treatment of the pressed juice, a centrifugal thin-film vacuum evaporator (EVAPOL CEP-1TM, product of Okawara Corp.) was used.

The distillation treatment was carried out by continuously recovering the distillate obtained by using a condenser for cooling of the components that gasified at a temperature of 90-95° C., under reduced pressure of 500-630 mmHg. The cooling conditions for the condenser were a cooling water temperature of 25° C., a cooling water flow rate of 15 $m^3$/hr and a condenser area of 2 $m^2$. When the starting pressed juice (2800 liters) was reduced to approximately 2400 liters and the Brix reached 14.5%, recovery of the distillate (solution containing the first distillate) was terminated. The obtained distillate was approximately 400 liters.

Separately, a column (column size: 2.6 cm inner diameter, 20 cm height) was packed with 40 ml of a synthetic adsorbent (AMBERLITETM XAD7HP by Organo Corp.), to prepare a column for column treatment of the distillate.

The distillate was passed through the prepared column at a flow rate of 40 liter/hr (SV=100 hr$^{-1}$). When passage of the distillate was complete, water was passed through for approximately 5 minutes at the same flow rate for rinsing of the column interior.

After rinsing with water, the elution solvent was passed through the column at a flow rate of 80 ml/hr (SV=2 hr$^{-1}$), for elution of the components adsorbed onto the synthetic adsorbent. The elution solvent used was an 80% ethanol aqueous solution (ethanol/water=80/20 (vol/vol)). Only the first 15 ml of eluate after passage of the elution solvent had begun was not recovered, while the eluate flowing out of the column thereafter (second eluate) was recovered. After 80 ml of elution solvent had passed through, distilled water was passed through at 80 ml/hr, terminating passage of the distilled water when the total amount of recovered eluate reached 100 ml.

The eluate obtained in this manner was filtered to obtain a slightly lemon-colored transparent filtrate. Filter paper (Qualitative Filter Paper No.2, product of Toyo Roshi Co., Ltd.) was used for filtration of the eluate. The obtained filtrate was measured with an alcohol concentration meter (YSA-200, product of Yazaki Meter Co., Ltd.), resulting in an ethanol content of 58 vol %. The sugarcane-derived extract obtained by this production example will hereunder be referred to as "extract (b)".

<Components Used>

The following components were used in the examples.
(Stevia Sweetener)
Rebaudioside A (rebaudioside A: ≥95%) (product of Haoten); this product is available in the U.S. from Shanghai Freemen as Stevia R-A. SK Sweet Z3 (glucosylated/glyco-modified stevia) (product of Nippon Paper Group, Inc.)
A9-90 (glucosylated stevia, rebaudioside A: ≥48%) (product of Morita Kagaku Co., Ltd.)
(Sugarcane-Derived Extract)
The extract (a) and the extract (b)
(γ-Aminobutyric Acid)
PharmaGABA (product of Pharma Foods International Co., Ltd.); Free γ-aminobutyric acid content: 86.5 g per 100 g of product as measured by automatic amino acid analysis.
(Other Components)
Suntheanine (product of Taiyo Kagaku Co., Ltd.)
α G hesperidin (Toyo Sugar Refining Co., Ltd.)

Formulation Example 1

Stevia formulations (Formulations 1 to 6) having the compositions shown in Table 1 below were prepared, and were added to commercially available coffee (black, sugar-free iced coffee, product of Pokka Corporation) to a content of 0.04 wt % (400 ppm by weight) of stevia sweetener with respect to the total amount of coffee. The content of the extract (a) with respect to the total amount of coffee was 5.76 ppm by weight, the content of the extract (b) with respect to the total amount of coffee was 3.00 ppm by weight, and the content of γ-aminobutyric acid, Suntheanine or αG hesperidin PA with respect to the total amount of coffee was 1.00 ppm by weight.

TABLE 1

| | Units (parts by wt.) | | | | | |
|---|---|---|---|---|---|---|
| | Formulation 1 | Formulation 2 | Formulation 3 | Formulation 4 | Formulation 5 | Formulation 6 |
| Rebaudioside A (Haoten) | 100 | 100 | 100 | 100 | 100 | 100 |
| Extract (a) | 1.44 | — | 1.44 | 1.44 | 1.44 | 1.44 |
| Extract (b) | 0.75 | 0.75 | — | 0.75 | 0.75 | 0.75 |
| γ-Aminobutyric acid (GABA) | 0.25 | 0.25 | 0.25 | — | — | — |
| Suntheanine | — | — | — | — | 0.25 | — |
| αG Hesperidin PA | — | — | — | — | — | 0.25 |

Each prepared coffee was evaluated in terms of palatability, aftertaste clearance, buildup of sweetness and flavor, by a panel of 11 evaluators, according to the following scales (Table 2).
(Palatability)
Each panel evaluated the general palatability on a 4-level scale, and the dominant result was used.
VG: Palatable
G: Somewhat palatable
F: Somewhat unpalatable
P: Unpalatable
(Aftertaste Clearance)
Each panel evaluated the clearance of lingering unpleasant sweetness (aftersweetness) on the following 4-level scale, and the dominant result was used. A better clearance represents reduced aftersweetness.
VG: Good clearance
G: Somewhat good clearance
F: Somewhat poor clearance
P: Poor clearance
(Buildup of Sweetness)
Each panel evaluated the time after entrance of the coffee in the mouth until the perception of sweetness on the following 4-level scale, and the dominant result was used. A better buildup of sweetness indicates faster appearance of sweetness after entrance in the mouth, and hence more natural sweetness (similar to sucrose).
VG: Good buildup of sweetness
G: Somewhat good buildup of sweetness
F: Somewhat poor buildup of sweetness
P: Poor buildup of sweetness
(Flavor)
Each panel evaluated the time after entrance of the coffee in the mouth until the perception of coffee flavor on the following 4-level scale, and the dominant result was used. A better flavor effect (buildup) indicates clearer coffee flavor.
VG: Good flavor buildup
G: Somewhat good flavor buildup
F: Somewhat poor flavor buildup
F: Poor flavor buildup

TABLE 2

| | Palatability | Aftertaste clearance | Buildup of sweetness | Flavor | Free comment |
|---|---|---|---|---|---|
| Formulation 1 | VG | VG | VG | VG | Sweetness with body, sweet. Rich coffee flavor. Natural sweet quality. |
| Formulation 2 | G | G | VG | VG | Notable thickness of stevia, lingering aftertaste. |

TABLE 2-continued

|  | Palatability | Aftertaste clearance | Buildup of sweetness | Flavor | Free comment |
|---|---|---|---|---|---|
| Formulation 3 | G | F | VG | G | Thickness of stevia, bitterness, strong aftertaste. Good initial buildup of sweetness |
| Formulation 4 | F | P | G | G | Initial effect perceived. Weaker effect afterwards. |
| Formulation 5 | F | G | F | F | Weak taste overall, particularly with lack of sweetness and coffee flavor. |
| Formulation 6 | F | P | VG | VG | Good sweetness and coffee flavor. Almost no effect on aftertaste or stevia. |

Formulation 1, which contained the high-purity rebaudioside A product, extract (a), extract (b) and γ-aminobutyric acid, received a high evaluation for all of the parameters of palatability, aftertaste clearance, buildup of sweetness and flavor. On the other hand, Formulation 2 which did not contain extract (a), Formulation 3 which did not contain extract (b) and Formulation 4 which did not contain γ-aminobutyric acid had insufficient aftertaste clearance (Formulations 2 to 4), insufficient buildup of sweetness (Formulation 4) or insufficient coffee aroma (Formulations 3 and 4), and insufficient palatability. Also, Formulation 5 which used Suntheanine instead of γ-aminobutyric acid had poor buildup of sweetness and coffee aroma, and insufficient palatability. In addition, Formula 6 which used αG hesperidin PA instead of γ-aminobutyric acid had absolutely no reduction in the bitterness and aftersweetness of the stevia sweetener.

Formulation Example 2

Stevia formulations (Formulations 7 to 12) having the compositions shown in Table 3 below were prepared, and were added to commercially available coffee (black, sugar-free iced coffee, product of Pokka Corporation) to a content of 0.033 wt % (330 ppm by weight) of stevia sweetener with respect to the total amount of coffee. In Formulations 7, 9 and 11, the content of extract (a) with respect to the total amount of coffee was 4.75 ppm by weight, the content of extract (b) with respect to the total amount of coffee was 2.48 ppm by weight, and the content of γ-aminobutyric acid with respect to the total amount of coffee was 0.83 ppm by weight. In Formulations 8, 10 and 12, the content of extract (a) with respect to the total amount of coffee was 0.50 ppm by weight, the content of extract (b) with respect to the total amount of coffee was 2.01 ppm by weight, and the content of γ-aminobutyric acid with respect to the total amount of coffee was 10.00 ppm by weight. Formulation 10 corresponds to the stevia sweetener and flavor improver composition described in Patent document 3.

TABLE 3

|  |  | Units (parts by wt.) | | | | | |
|---|---|---|---|---|---|---|---|
|  |  | Formulation 7 | Formulation 8 | Formulation 9 | Formulation 10 | Formulation 11 | Formulation 12 |
| Stevia sweetener | Rebaudioside A (Haoten) | 100 | 100 | — | — | — | — |
|  | SK Sweet Z3 | — | — | 100 | 100 | — | — |
|  | A9-90 | — | — | — | — | 100 | 100 |
| Extract (a) |  | 1.44 | 0.15 | 1.44 | 0.15 | 1.44 | 0.15 |
| Extract (b) |  | 0.75 | 0.61 | 0.75 | 0.61 | 0.75 | 0.61 |
| γ-Aminobutyric acid (GABA) |  | 0.25 | 3.03 | 0.25 | 3.03 | 0.25 | 3.03 |

Each prepared coffee was evaluated in terms of palatability, aftertaste clearance, buildup of sweetness and flavor, by a panel of 10 evaluators, in the same manner as Formulation Example 1 (Table 4).

TABLE 4

|  | Palatability | Aftertaste clearance | Buildup of sweetness | Flavor | Free comment |
|---|---|---|---|---|---|
| Formulation 7 | VG | VG | VG | VG | Sweetness with body, sweet. Rich coffee flavor. Natural sweet quality. |
| Formulation 8 | G | G | F | F | Good sweet quality, slow appearance of sweetness, weak coffee flavor. |
| Formulation 9 | F | G | F | F | Some effect, but lingering aftertaste. Weak sweetness and coffee taste. Strong bitterness. |
| Formulation 10 | G | G | G | F | Good sweet quality, sweetness. Weak coffee flavor, with notable bitterness. Lingering aftertaste. |
| Formulation 11 | F | P | F | F | Weak sweetness, weak coffee flavor, lingering bitterness and sweetness. Strong stevia flavor. |
| Formulation 12 | F | P | F | G | Coffee flavor accompanied by flavor of stevia., with strong lingering aftertaste. |

Formulation 7, which contained the high-purity rebaudioside A product, extract (a), extract (b) and γ-aminobutyric acid, received a high evaluation for all of the parameters of palatability, aftertaste clearance, buildup of sweetness and flavor. On the other hand, Formulations 9 and 11, which used glucosylated/glycomodified stevia (low rebaudioside A content) instead of a high-purity rebaudioside A product, were insufficient in terms of palatability, aftertaste clearance, buildup of sweetness and flavor. Similar results were also obtained with Formulations 8, 10 and 12, which had lower extract (a) contents and higher γ-aminobutyric acid contents compared to Formulation 7.

Formulation Example 3

Stevia formulations (Formulations 1 and 13 to 21) having the compositions shown in Table 5 below were prepared, and were added to commercially available coffee (black, sugar-free iced coffee, product of Pokka Corporation) to a content of 0.04 wt % (400 ppm by weight) of stevia sweetener with respect to the total amount of coffee.

With Formulation 13 which had a higher extract (a) content than Formulations 1 and 7, the coffee aroma was insufficient. With Formulation 17 which had a lower extract (a) content, the effect on aftersweetness and bitterness of the stevia sweetener was insufficient. With Formulations 14 to 16, which had extract (a) contents between those of Formulation 13 and Formulation 17, a favorable effect was obtained, although not to the degree obtained with Formulation 1.

With Formulation 18 which had a higher extract (b) content and Formulation 19 which had a lower extract (b) content, compared to Formulations 1 and 7, favorable effects were obtained, although not to the degree obtained with Formulation 1.

With Formulation 20 which had a higher γ-aminobutyric acid content than Formulations 1 and 7, the coffee aroma was insufficient. With Formulation 21 which had a lower γ-aminobutyric acid content, a favorable effect was obtained, although not to the degree obtained with Formulation 1.

<Application in Near Water>

Stevia formulations (Formulations 22 and 23) having the compositions shown in Table 7 below were prepared, and

TABLE 5

| | Units (parts by wt.) | | | | | | | | | |
|---|---|---|---|---|---|---|---|---|---|---|
| | Formulation 1 | Formulation 13 | Formulation 14 | Formulation 15 | Formulation 16 | Formulation 17 | Formulation 18 | Formulation 19 | Formulation 20 | Formulation 21 |
| Rebaudioside A (Haoten) | 100 | 100 | 100 | 100 | 100 | 100 | 100 | 100 | 100 | 100 |
| Extract (a) | 1.44 | 5.01 | 1.91 | 1.69 | 1.41 | 0.27 | 1.44 | 1.44 | 1.44 | 1.44 |
| Extract (b) | 0.75 | 0.75 | 0.62 | 0.75 | 0.62 | 0.75 | 2.50 | 0.0625 | 0.75 | 0.75 |
| γ-Aminobutyric acid (GABA) | 0.25 | 0.25 | 0.25 | 0.25 | 0.25 | 0.25 | 0.25 | 0.25 | 12.5 | 0.0125 |

Each prepared coffee was evaluated in terms of palatability, aftertaste clearance, buildup of sweetness and flavor, by a panel of 10 evaluators, in the same manner as Formulation Example 1 (Table 6).

were added to water to a content of 0.04 wt % (400 ppm by weight) of stevia sweetener with respect to the total amount of water.

TABLE 6

| | Palatability | Aftertaste clearance | Buildup of sweetness | Flavor | Free comment |
|---|---|---|---|---|---|
| Formulation 1 | VG | VG | VG | VG | Sweetness with body, sweet. Rich coffee flavor. Natural sweet quality. |
| Formulation 13 | G | VG | G | F | Effect on stevia VG, effect on sweetness and coffee flavor too strong, producing weak flavor. |
| Formulation 14 | G | VG | VG | G | Aftertaste and buildup of sweetness satisfactory, noticeable effect, coffee flavor weak and merely sweet. |
| Formulation 15 | G | VG | G | G | Weak buildup of sweetness and top. Coffee flavor dominated by bitterness. |
| Formulation 16 | VG | G | VG | VG | Problem only with stevia aftertaste, otherwise satisfactory. |
| Formulation 17 | F | F | G | G | Weak effect on stevia. |
| Formulation 18 | G | VG | G | G | Effect: VG, particularly strong effect on coffee flavor, somewhat weak taste. |
| Formulation 19 | G | G | VG | VG | Aftertaste slightly unpleasant, sweetness and coffee flavor: VG. |
| Formulation 20 | G | VG | G | F | Coffee taste altered, due to acidity? Strong effect on stevia. |
| Formulation 21 | G | G | VG | VG | Aftertaste slightly unpleasant, sweetness and coffee flavor: VG. |

TABLE 7

| Units (parts by wt.) | Formulation 22 | Formulation 23 |
|---|---|---|
| Rebaudioside A (Haoten) | 100 | 100 |
| Extract (a) | 1.41 | 1.35 |
| Extract (b) | 0.62 | 0.60 |
| γ-Aminobutyric acid (GABA) | 1.25 | — |
| Methyl hesperidin | — | 1.20 |
| Citric acid | 250 | 250 |
| Peach flavor | 125 | 125 |

Each prepared near water was evaluated by a panel of 9 evaluators based on the following scale (Table 8). Each panel evaluated the general palatability on a 4-level scale, and the dominant result was used.
VG: Palatable
G: Somewhat palatable
F: Somewhat unpalatable
P: Unpalatable

TABLE 8

| | Evaluation | Free comment |
|---|---|---|
| Formulation 22 | VG | Good balance between acidity and sweetness. Cleared aftertaste, sharp flavor |
| Formulation 23 | G | Somewhat unsatisfactory aftertaste clearance. |

The near water prepared using the stevia formulation of the invention (Formulation 22) had sufficiently reduced unpleasant taste including the aftersweetness and bitterness of the stevia sweetener, rapid buildup of sweetness, excellent body and an excellent effect of the desirable flavor (peach flavor).

<Application in Coffee>
Stevia formulations (Formulations 24 and 25) having the compositions shown in Table 9 below were prepared, and were added to commercially available coffee (black, sugar-free iced coffee, product of Pokka Corporation) to a content of 0.04 wt % (400 ppm by weight) of stevia sweetener with respect to the total amount of coffee.

TABLE 9

| Units (parts by wt.) | Formulation 24 | Formulation 25 |
|---|---|---|
| Rebaudioside A (Haoten) | 100 | 100 |
| Extract (a) | 1.41 | 1.35 |
| Extract (b) | 0.62 | 0.60 |
| γ-Aminobutyric acid (GABA) | 1.25 | — |
| Methyl hesperidin | — | 1.20 |

Each prepared coffee was evaluated by a panel of 10 evaluators, in the same manner as Formulation Example 4 (Table 10).

TABLE 10

| | Evaluation | Free comment |
|---|---|---|
| Formulation 24 | VG | Good buildup of sweetness, strong coffee flavor, cleared aftertaste. |
| Formulation 25 | G | Weak sweetness, noticeable effect but somewhat unsatisfactory aftertaste clearance. |

The coffee prepared using the stevia formulation of the invention (Formulation 24) had sufficiently reduced unpleasant taste including the aftersweetness and bitterness of the stevia sweetener, rapid buildup of sweetness, excellent body and an excellent effect of the desirable flavor (coffee aroma).

The invention claimed is:
1. A stevia formulation comprising:
(1) a stevia sweetener with a rebaudioside A content of 95% by weight or greater;
(2) 0.35 to 5.00 parts by weight of a first sugarcane-derived extract with respect to 100 parts by weight of the stevia sweetener;
(3) 0.06 to 2.50 parts by weight of a second sugarcane-derived extract with respect to 100 parts by weight of the stevia sweetener; and
(4) 0.010 to 10.0 parts by weight of γ-aminobutyric acid with respect to 100 parts by weight of the stevia sweetener;
wherein the first sugarcane-derived extract contains a first eluted component obtained by passing a raw material selected from the group consisting of sugarcane juice and sugarcane-derived molasses through a column packed with a first porous adsorbent, and eluting the components adsorbed onto the porous adsorbent with a solvent containing at least one selected from the group consisting of methanol and ethanol,
wherein the first porous adsorbent is at least one selected from the group consisting of aromatic resins, acrylic acid-based methacryl resins and acrylonitrile aliphatic resins,
wherein the second sugarcane-derived extract contains a second eluted component obtained by passing a solution containing a distillate through a column packed with a second porous adsorbent, and eluting the components adsorbed onto the porous adsorbent with a solvent containing at least one selected from the group consisting of methanol and ethanol,
wherein the distillate is obtained by distillation of a raw material selected from the group consisting of sugarcane juice and solvent extracts of sugarcane, and
wherein the second porous adsorbent is at least one selected from the group consisting of aromatic resins, acrylic acid-based methacryl resins and acrylonitrile aliphatic resins.
2. A food or beverage comprising the stevia formulation according to claim 1.
3. A pharmaceutical product comprising the stevia formulation according to claim 1.
4. A method for improving the flavor of a stevia sweetener, the method comprising the steps of:
(1) providing a stevia sweetener with a rebaudioside A content of 95% by weight or greater;
(2) providing a first sugarcane-derived extract, a second sugarcane-derived extract and γ-aminobutyric acid; and
(3) combining the stevia sweetener with 0.35 to 5.00 parts by weight of the first sugarcane-derived extract with respect to 100 parts by weight of the stevia sweetener, 0.06 to 2.50 parts by weight of the second sugarcane-derived extract with respect to 100 parts by weight of the stevia sweetener, and 0.010 to 10.0 parts by weight of γ-aminobutyric acid with respect to 100 parts by weight of the stevia sweetener,
wherein the first sugarcane-derived extract contains a first eluted component obtained by passing a raw material selected from the group consisting of sugarcane juice and sugarcane-derived molasses through a column packed with a first porous adsorbent, and eluting the components adsorbed onto the porous adsorbent with a solvent containing at least one selected from the group consisting of methanol and ethanol, wherein the first porous adsorbent is at least one selected from the group consisting of aromatic resins, acrylic acid-based methacryl resins and acrylonitrile aliphatic resins, wherein the second sugarcane-derived extract contains a second eluted component obtained by passing a solution containing a distillate through a column packed with a second porous adsorbent, and eluting the components adsorbed onto the porous adsorbent with a solvent containing at least one selected from the group consisting of methanol and ethanol, wherein the distillate is obtained by distillation of a raw material selected from the group consisting of sugarcane juice and solvent extracts of sugarcane, and wherein the second porous adsorbent is at least one selected from the group consisting of aromatic resins, acrylic acid-based methacryl resins and acrylonitrile aliphatic resins.

* * * * *